INVENTORS
WILLIAM CASTEDELLO
BY EDWARD K. KAPRELIAN

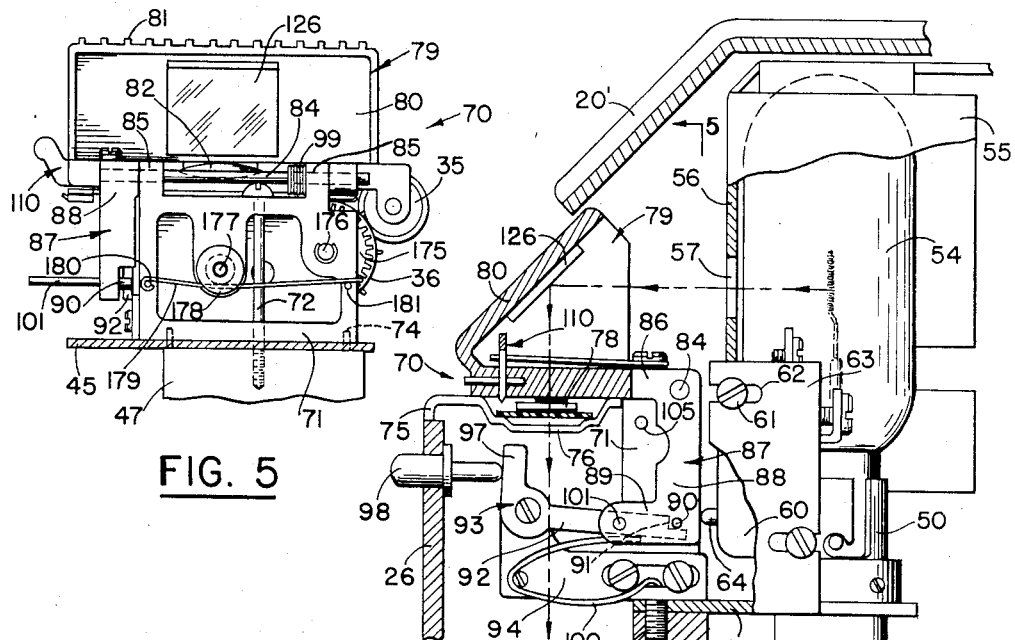
FIG. 5
FIG. 3
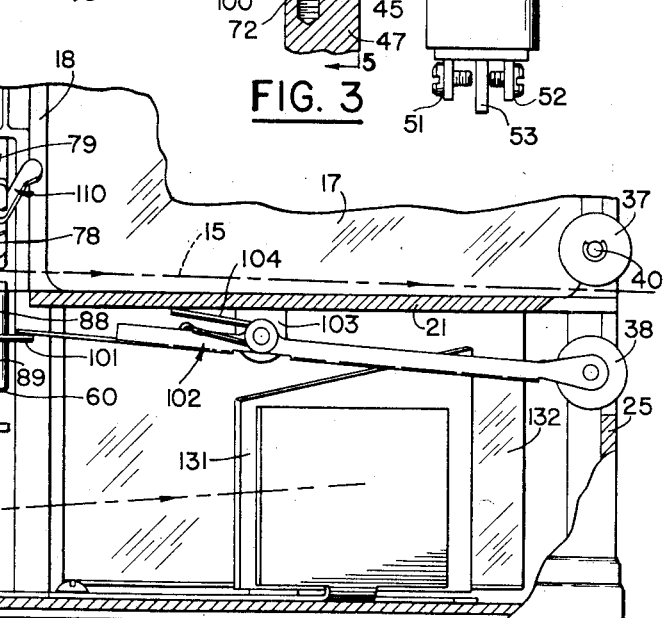
FIG. 7
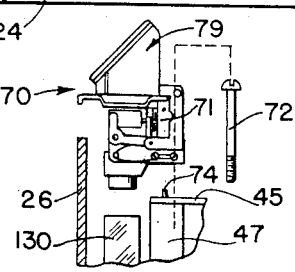
FIG. 6
*INVENTORS*
WILLIAM CASTEDELLO
EDWARD K. KAPRELIAN
ATTORNEY Sept. 29, 1959 W. CASTEDELLO ET AL 2,906,167
VIEWING DEVICE FOR VIEWING AND EDITING MOVIE FILMS
Filed June 29, 1953 5 Sheets-Sheet 3

ATTORNEY

Sept. 29, 1959  W. CASTEDELLO ET AL  2,906,167
VIEWING DEVICE FOR VIEWING AND EDITING MOVIE FILMS
Filed June 29, 1953  5 Sheets-Sheet 4

INVENTORS
WILLIAM CASTEDELLO
EDWARD K. KAPRELIAN
BY
*Frederick E. Hang*
ATTORNEY Sept. 29, 1959     W. CASTEDELLO ET AL     2,906,167
VIEWING DEVICE FOR VIEWING AND EDITING MOVIE FILMS
Filed June 29, 1953                                                5 Sheets-Sheet 5

INVENTORS
WILLIAM CASTEDELLO
EDWARD K. KAPRELIAN
BY
ATTORNEY

United States Patent Office 2,906,167
Patented Sept. 29, 1959

2,906,167

VIEWING DEVICE FOR VIEWING AND EDITING MOVIE FILMS

William Castedello and Edward K. Kaprelian, Plainville, Conn., assignors to The Kalart Company Inc., Plainville, Conn.

Application June 29, 1953, Serial No. 364,602

5 Claims. (Cl. 88—24)

The present invention relates to viewing devices as are used to edit movie films, particularly to viewing devices as used by amateurs, although suitable for professional use also.

Viewing and editing devices of the general type above referred to serve to project frames of a movie film successively, one by one, upon an observation or viewing screen thereby permitting a review of the film, frame by frame, for the purpose of eliminating less desirable frames and inserting appropriate titles. Such devices are usually equipped with a feed reel and a take-up reel for feeding the film to be viewed and edited through the device.

One of the objects of the present invention is to provide a novel and improved film viewing device which can be easily and conveniently operated by a single actuating means operation of which switches off the lamp used to illuminate the viewing screen and releases means for transporting and guiding a film through the device for inserting or removing the film.

Another object of the invention is to provide a novel and improved viewing device which can be conveniently and inexpensively manufactured by arranging most of the essential components of the device in form of preadjusted sub-assemblies whereby the final assembly of the device is greatly facilitated.

Still another object of the invention, associated with the preceding one, is to assemble all the components of the device the dimensions of which are controlled by the width of the film as a self-contained unit which is mounted in the casing of the device by very simple locating and fastening means such as a single screw so that the viewing device can be conveniently adapted to films of different width —8 millimeter and 16 millimeter being widths of film frequently used, particularly by amateurs—by simply exchanging one unit for another one designed for the width of the film in question thereby increasing the versatility of the device.

A further object of the invention is to equip the viewing device with film marking means which permit to mark selected frames of the film as preparation of splicing, removal or other operations to be performed later on.

Still another object of the invention is to provide novel and improved support and operating means for the feed reel and the take-up reel of the viewing device which permit to place said reels in a position closely adjacent to the casing of the device so that the latter occupies a minimum of space when not in use.

Other and further objects, features and advantages of the invention will be pointed out hereinafter and set forth in the appended claims forming part of the application.

In the accompanying drawing a now preferred embodiment of the invention is shown by way of illustration and not by way of limitation.

In the drawings:

Fig. 3 is a fragmentary sectional view taken on line 3—3 of Fig. 2.

Fig. 5 is a sectional view taken on line 5—5 of Fig. 3.

Fig. 6 is a detail view of the unit of the viewing device which must be exchanged for adapting the device to films of different width.

Fig. 7 is a front view of Fig. 1, partly in section and showing some of the components illustrated in Fig. 2 in different operational positions.

Figure 1:
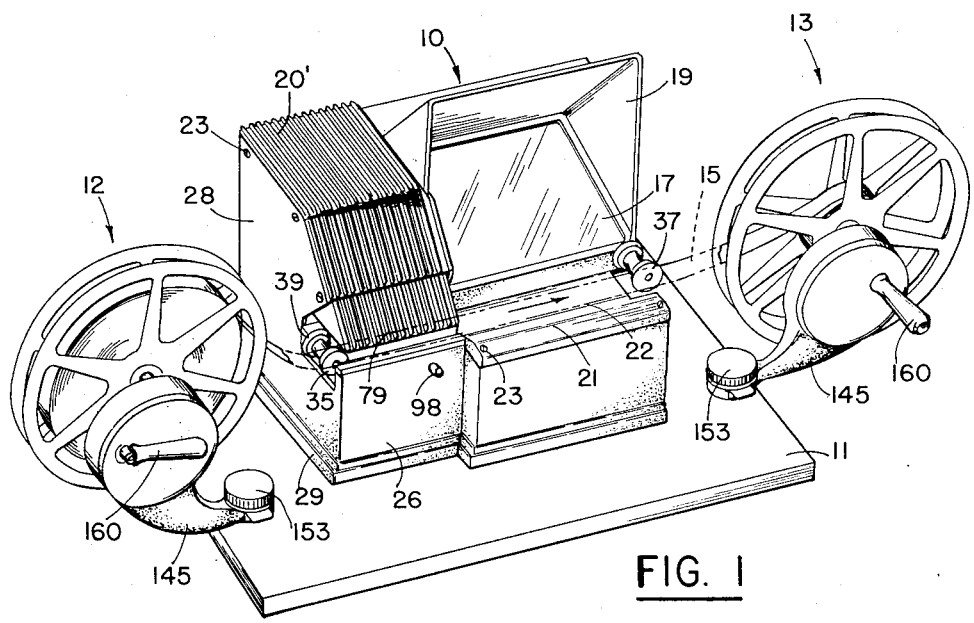
Fig. 1 is an isometric assembly view of a film viewing device according to the invention in its position ready for use.

The assembled film viewing device as shown in Fig. 1 comprises a casing generally designated by 10 in which the film transport means, the optical means including the shutter means, the viewing screen, the light unit and other essential components of the device are housed. The casing is shown as mounted on a base 11 which may be a base board or may be visualized as part of a carrying case for the device. Base board 11 also supports the feed reel 12 and the take-up reel 13. It may also support, if desirable, accessories such as a film splicer, a bottle of film cement and a bottle of water.

Figure 15:
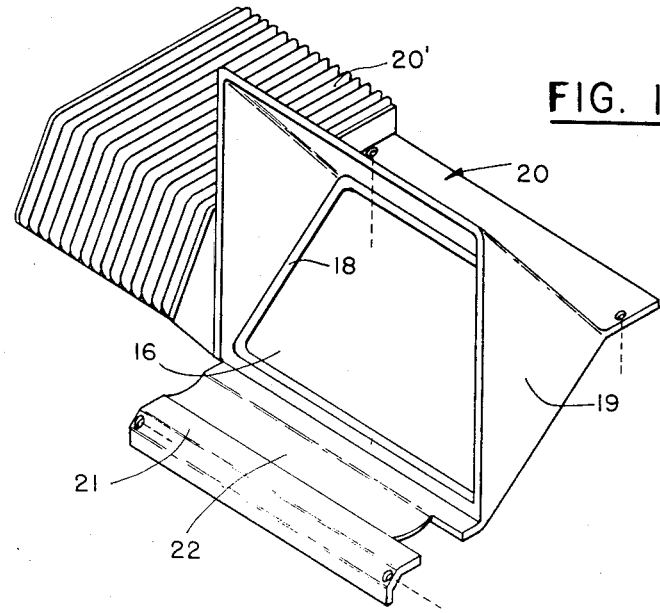
Fig. 15 is an isometric view of the cover of the casing.
Figure 14:
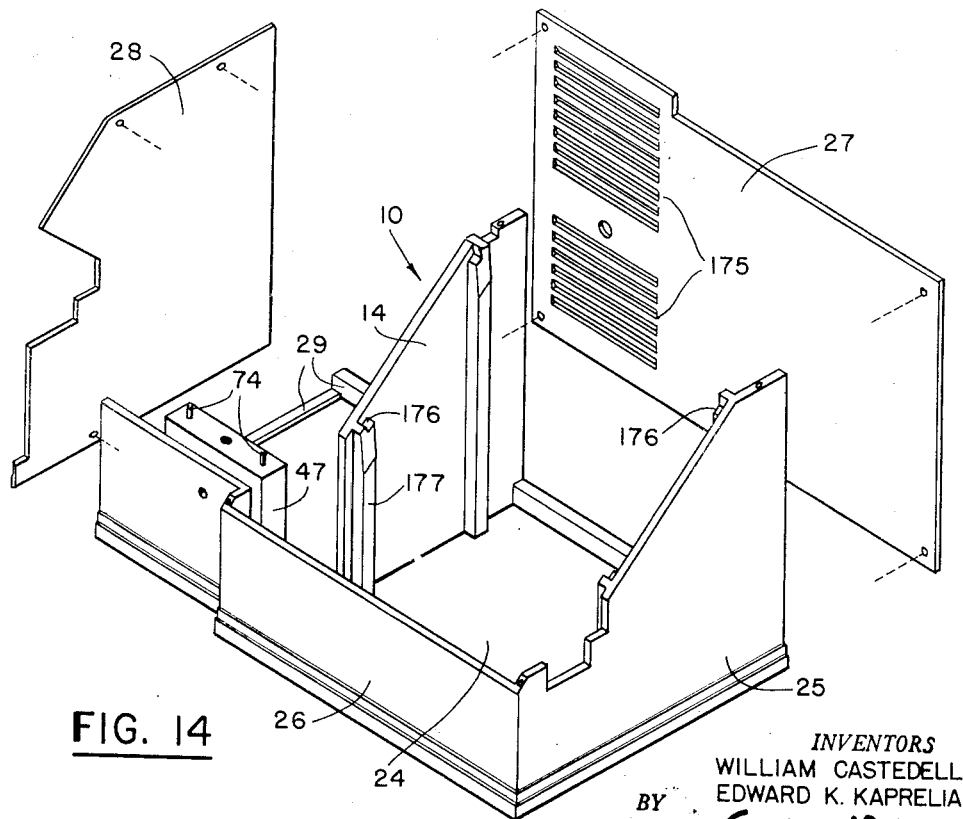
Fig. 14 is an isometric view of the casing of the viewing device, the cover being removed.

As can best be seen in Figs. 14 and 15, the casing comprises a unitary base portion including a bottom wall 24 to which are secured or with which are integral a side wall 25 and a front wall 26. The second side wall 28 and the rear wall 27 are designed as separate elements. The casing is completed by a preferably one-piece cover generally designated by 20. The walls 27 and 28 and the cover are secured to the bottom assembly and to each other by any suitable means such as screws 23 extending through the holes clearly shown in Figs. 14 and 15. Walls 27 and 28 are held in position at their base ends by flanges 29 raised from bottom wall 24.

The casing formed by the aforementioned walls is divided by a partition wall 14 secured to bottom 24 or integral therewith in a small compartment and a large compartment. As will appear from the subsequent description, part of the film guiding means, the optical means, the light unit and the control means are mounted within the small compartment, and the light beam reflecting means and the viewing screen preferably frosted on one side and made of glass or a suitable plastic are disposed within the large compartment in which they are protected by divider 14 from the heat developed by the light unit. The small compartment may be ventilated by louvers 175 in rear wall 27.

For the purpose of supporting and holding in position a viewing screen 17 four notches or shoulders 176 are provided which are shown as being formed on vertical studs 177, two of the studs being disposed on the inside of wall 25 and the other two on partition wall 14. The top edge of side wall 25 and partition wall 14 and shoulders 176 are downwardly slanted to support the viewing screen in slanted position as convenient for viewing of the images.

The forward edge of partition wall 14 forms a gap with the front wall 26 to permit passage of the film from the small compartment into the large compartment, and walls 28 and 25 are notched for passage of the film through the device and for accommodating the control means of the device as will be more fully explained hereinafter.

The portion of cover 20 covering the large compartment is formed with a substantially rectangular opening 16 through which the viewing screen is visible when placed upon its support notches 176. The viewing screen is secured in position when the cover is attached to the bottom assembly of the casing by a rim 18 lining opening 16 and overlying the marginal portions of the viewing screen. A hood 19 raised from the aforementioned right hand portion of the cover serves to shade the viewing screen thereby facilitating the observation of images thereon.

The forward edge of the cover portion forming said opening 16 is horizontally extended to constitute a platform 21 in which a track groove 22 for the film is formed.

The left hand portion of the cover covering the small compartment is preferably provided with fins or cooling ribs 20' to dissipate the heat developed within the small compartment by the light unit. The forward edge of this cover portion ends short of the respective top edge portion of front wall 26 to form a gap therewith in which the control means of the device are accommodated as will appear from the subsequent description.

As appears from the previous description, the arrangement of the casing permits to mount the respective components of the viewing device within the unitary base portion and then to complete the assembly of the device by securing the second side wall 28, the rear wall 27 and the cover to the base portion, mounting of the cover holding the viewing screen 17 in position.

The film transport and guiding means of the viewing device comprise two pairs of rolls 35, 36 and 37, 38 respectively.

Roll 36 is a sprocket wheel. The side of the roll having the sprockets face a grooved flange 39 of roll 35 to guide the sprocket holes of the film in a conventional manner. The opposite ends of both rolls 35 and 36 are preferably provided with peripherally grooved flanges to prevent damage to a sound track which may be on the film. The two rolls 37 and 38 are preferably also provided with peripherally grooved flanges at both ends to protect the sprocket holes and a sound track on the film. The configuration of rolls 35 to 38 and the coaction of these rolls with each other is conventional so that a further detailed description thereof is not essential for the understanding of the invention.

Rolls 36 and 37 are stationarily mounted while rolls 35 and 38 are movable between an operative position for guidance of the film and a release position for insertion of the film between the coacting rolls or removal therefrom. More specifically, roll 37 is rotatably supported on the cover of the casing by an axle 40 extending therefrom and roll 36 coacts with the optical system and the shutter means of the viewing device as will be more fully explained hereinafter.

The light unit, the image producing optical means including the shutter means of the device, the means for controlling the operation of the device, rolls 35 and 36 of the transport means and the film marking means are all disposed within the left hand small compartment of the casing and will now be described in detail.

All the aforementioned components of the viewing device are supported on a bracket plate 45 fastened to a support post or block 47 secured to the bottom wall 24 or preferably integral therewith. Bracket 45 mounts a socket 50 of the bayonet type which is extended through the bracket. The terminals 51 and 52 of the socket, preferably separated by a strip 53 of insulation material, serve to connect socket 50 with a suitable source of current, generally through a connecting cord (not shown). Socket 50 is designed to receive a projection lamp 54 of a type generally used for devices of the type here in question. A shield 55, preferably made of thin sheet metal, may be yieldably fitted upon the lamp to prevent stray light within the compartment and to aid in directing the heat of the lamp away from the front of the casing. The front wall 56 of shield 55 includes a window 57 to emit the beam of light used in the viewing device.

The circuit connections of the light unit include a switch of suitable design generally a miniature snap switch 60 secured by means of screws 61 within slots 62 formed in a support arm 63 extending from bracket 45. Switch 60 is operated by means of a control button 64 so arranged that the lamp circuit is closed when button 64 is depressed.

The image-producing optical and shutter means, the control means for controlling the operation of the device, guide rolls 35 and 36 and the film marking means are all structurally combined in form of a self-contained control unit or head 70 which can be attached to or removed from bracket 45.

For the purpose of facilitating mounting of unit 70, the components of the unit are mounted on a frame structure 71. This frame structure and hence the entire unit 70 is attachable to bracket 45 by simple fastening means such as a single screw 72 threaded into post 47. Locating pins 74 extending from bracket 45 and engaging corresponding holes in the base of frame 71 or vice versa may be provided to facilitate mounting of the unit in its correct position on bracket 45. Fig. 6 shows unit 70 separated from the bracket to illustrate how the unit is attached to and removed from bracket 45.

The top wall of frame 71 supports a platform 75 fixedly secured thereto. Platform 75 is longitudinally grooved to form a guide track or gate 76 for the film to be reviewed. A window 77 in track 76 provides passage for the light beam emanating from lamp 54 and directed through film 15 as will be more fully explained hereinafter.

Frame 71 further mounts a control member 79 supporting guide roll 35 and a pressure plate 78 for holding film 15 in position in its guide track 76. This member is shown as a hollow member of substantially triangular cross-section. The side of the member facing lamp 54 is open while all other sides thereof are closed. The front side 80 of member 79 is downwardly slanted and forms substantially a continuation of the slanted top wall portion of casing 10 as can best be seen on Fig. 1. Front wall 80 is preferably also provided with cooling fins 81.

A condenser lens 82 is inserted in a grooved aperture formed in the member 79 for the passage of the light from lamp 54. A corresponding gate 83 is provided in pressure plate 78 as is clearly shown on Fig. 7.

Member 79 is mounted on frame 71 by means of a pivot pin 84. This pin is pivoted to frame 71 by means of ears 85 protruding therefrom and to member 79 by means of a pivot hole in a two-arm lever 87 extending from the bottom wall of frame 79. This lever 87 has an arm 86 secured to member 79 and an extension 89 extending at a right angle from arm 88. Arm 88 is arranged to coact with switch button 64 as can best be seen in Figs. 3 and 4. Extension 89 is cut out on its side facing frame 71 as can best be seen on Fig. 5. A locking pin 90 extending from lever extension 89 within this cut-out portion coacts with a shoulder or nose 91 formed in one arm 92 of a second two-arm actuating lever 93. This lever is pivoted to a bracket 94 secured to frame 71 by means of screws 95 threaded through an elongated slot 96 in plate 94 to permit an adjustment of lever 93 or more specifically of its pivot point relative to lever 87. The second arm 97 of lever 93 coacts with a control button 98 slidably fitted in front wall 26 of the casing. A loaded spring means such as spring 99 serves to bias member 79 into the position shown in Fig. 4. Similarly, a loaded spring 100 biases lever 93 toward the position of Fig. 3.

Figure 2:
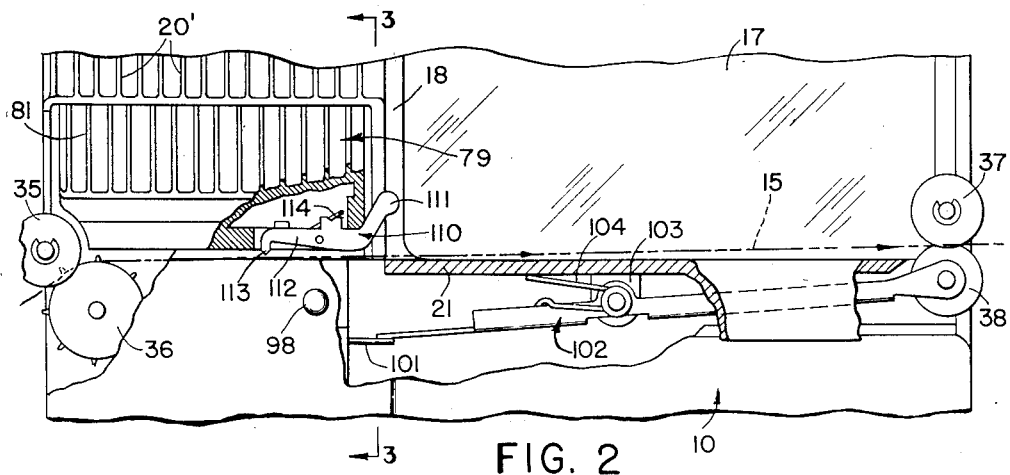
Fig. 2 is a fragmentary sectional front view of Fig. 1 on an enlarged scale.
Figure 10:
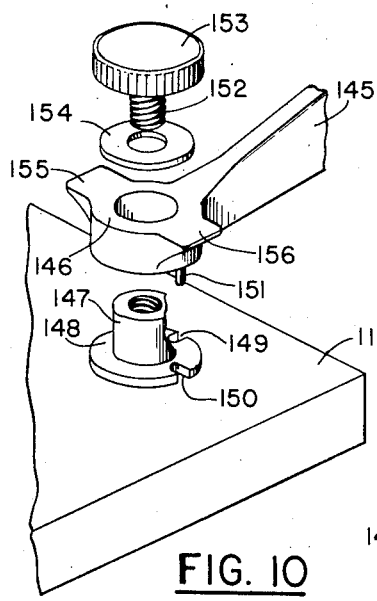
Fig. 10 is an isometric detail view of the support means for the reels of the viewing device.
Figure 11:
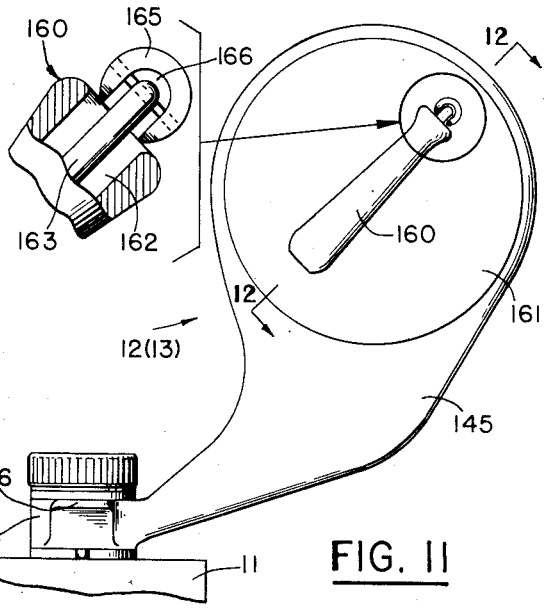
Fig. 11 is a detail view of one of the reel assemblies of the viewing device.

A second locking pin 101 extending from extension 89 of lever arm 88 coacts with the end of one arm of a two-arm lever 102 the other arm of which supports roll 38. Lever 102 is mounted within the large compartment of the casing by means of a mounting bracket 103 extending from the platform 21 formed by the casing. A loaded spring 104 serves to bias lever 102 into a position in which guide roll 38 coacts with roll 37 for guiding a film therebetween. Fig. 7 shows a position of lever 102 in which the two rolls 37 and 38 are spaced apart for removal or insertion of a film and Fig. 2 shows the two rolls in coacting position. Lever 102 may be reinforced by giving it a channel shaped cross-section. The pivotal movement of lever 87 is limited by a stop pin 105 engageable with lever arm 88 as can best be seen on Fig. 4.

The film marking means also supported by control member 79 are shown as a two-arm lever generally designated by 110. One arm of this lever forms an actuating handle 111 protruding from member 79 and the other arm 112 ends in a downwardly directed point 113. Lever 110 is loaded by means of a spring 114 which biases the lever into the position of Fig. 2 in which point 113 thereof is held above a film guided between pressure plate 78 and guide track 76. As can best be seen in Fig. 4, the plate 78 is yieldably supported on member 79 by means of a spring 115 which biases plate 78 into a position in which the pointed nose 113 of lever 110 is behind the plate thereby protecting the film against unintended marking by the nose. This nose can be extended through a notch 116 in plate 78 when it is desired to mark a selected frame of the film.

Figure 8:
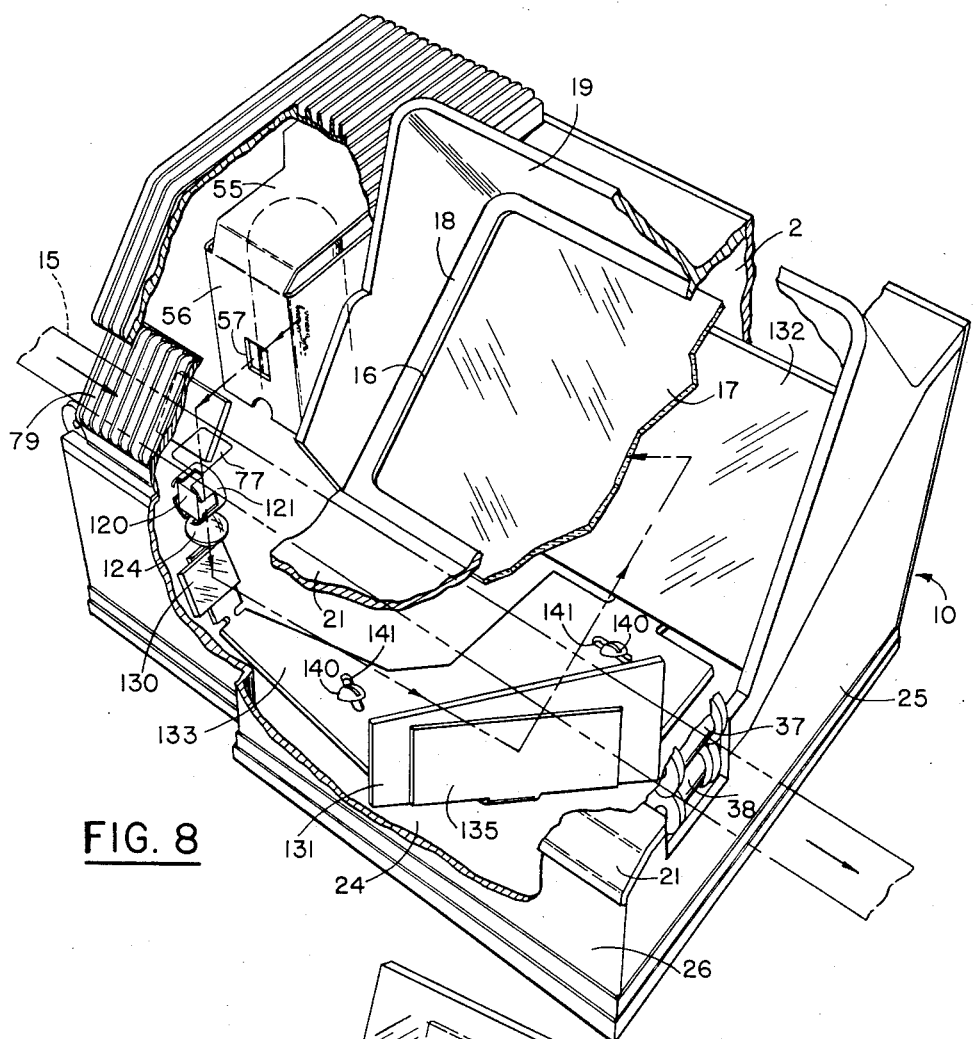
Fig. 8 is a fragmentary isometric view similar to Fig. 1, the casing of the device being partly broken away to show the interior of the device.

Referring now to the image-forming and shutter means, these means comprise a polygonal prism 120 shown as a square prism, rotatably supported by a shaft 177 on frame 71 below guide track 75 and in alignment with window 77, lens 82 and window 83. Prism 120 is inserted in a shutter sleeve 121 for joint rotation therewith. This sleeve is provided with four axial slots each facing the four square sides of the prism, as is clearly shown on Figs. 7 and 8, and constitutes the obturator element of a shutter. The prism and the sleeve are operatively coupled through a gear train including a gear 175 fixedly mounted together with sprocket roll 36 on a shaft 176, a gear 122, and a pinion (not shown) mounted on shaft 177 for the prism so that upon a rotation of roll 36 during the transport of the film through the device the prism 120 and obturator 121 are rotated at a definite ratio of rotation relative to roll 36.

Figure 9:
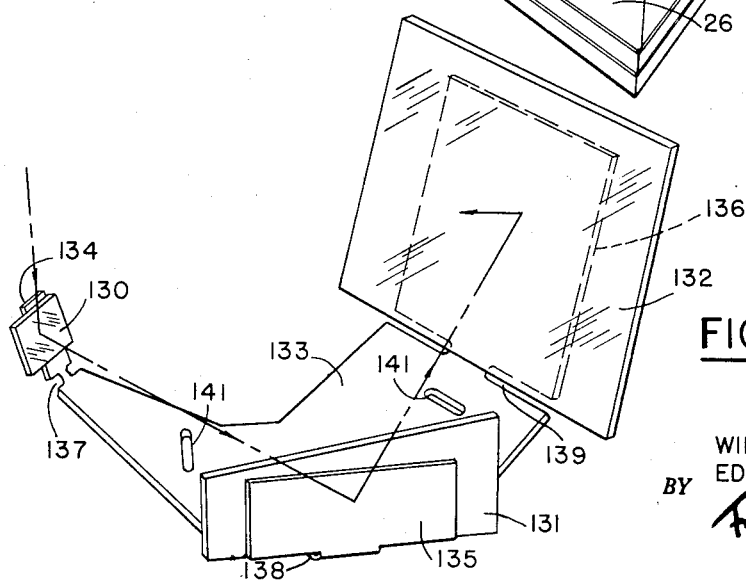
Fig. 9 is in isometric detail view of the mirror assembly of the viewing device.

To obtain an immediate stoppage of the prism and the components associated with the prism when the film is stopped and for the purpose of avoiding an irregular movement of the film due to gear backlash, a brake is preferably provided for the prism. This brake is shown as a peripherally grooved wheel 178 fixedly mounted on shaft 177 and a spring 179 fixedly secured on one end at 180 to member 71 and resting with its free end against a stop 181. As a result, the spring tension will exert a braking effect upon shaft 177 and, hence, prism 120 and the gear train associated therewith. The arrangement of the prism, and the obturator and the required ratio of rotation thereof relative to the sprocket roll serve to produce standing images of successive frames on the viewing screen 17. As an arrangement of this type is well understood in the art and does not constitute part of the invention, except that the optical and shutter means constitute part of the detachable self-contained unit or head 70, it is not essential for the understanding of the invention to describe this arrangement in detail. A lens barrel 125 housing a preferably adjustably mounted projection lens 124 is disposed in alignment with the prism and the aforementioned window 77, lens 82 and window 83. Lens 124 images the film on the screen, adjustment of the lens permitting accurate focusing. Light from the lens reaches the screen through the action of light reflecting means which will now be described in detail. These deflecting means comprise a mirror 126 mounted on the inside of the slanted wall of member 79 to deflect a light beam passing through window 57 of shield 55 through lens 82, gate 83, the film guided between pressure plate 78 and guide track 76 and window 77 toward the prism and through lens 124. The light deflecting means further comprise a mirror assembly including the mirrors 130, 131 and 132. These mirrors are mounted on a common frame 133, more specifically on ears or prongs 134, 135 and 136 respectively. The frame is preferably made of comparatively thin sheet metal so that the angular relative position of the mirrors can be conveniently adjusted by simply bending the frame material. As can best be seen on Fig. 9, the frame material is preferably cut out at the bending lines 137, 138 and 139 further to facilitate the adjustment of the mirrors by bending the prongs supporting the same relative to the base part of the frame. The mirror assembly is mounted as a unit in the casing by any suitable means shown as screws 140 threaded into the bottom wall of the casing by elongated slots 141. These elongated slots permit a further adjustment of the mirror positions relative to each other and the viewing screen.

The arrows in the figures indicate the reflection of a beam of light upon the rear side of screen 17 by the mirrors.

The film may be continually moved through the viewing device by any suitable means. The simplest way would be to pull the film through the device by hand. However, in practice reels such as reels 12 and 13 are generally used. As previously mentioned, one of the objects of the invention is to reduce the total space occupied by the viewing device when not in use by placing the reels substantially parallel to the side walls of the casing. For this purpose the support arm 145 of each reel ends in a pivot sleeve 146 journaled upon a pivot stud 147 secured to the base board 11. This stud is formed with a flange 148 including two notches 149 and 150 circumferentially spaced by an angle of 90°. These notches coact with a locking pin 151 depending from pivot sleeve 146. Accordingly, arm 145 and with it the respective reel may be placed either in the operational position of Fig. 1 by engagement of pin 151 with notch 150 or in a position substantially parallel to the side wall of the casing by turning arm 145 into the position in which pin 151 is in engagement with notch 149. Arm 145 is preferably held in its position upon and relative to stud 147 by a screw 152 with a knurled head 153. A washer 154 may be interposed between screw head 153 and pivot sleeve 146. To facilitate lifting of arm 145 into a position in which pin 151 clears the respective notch 149 or 150, grips or lugs 155 and 156 may laterally extend from pivot sleeve 146.

Figure 13:
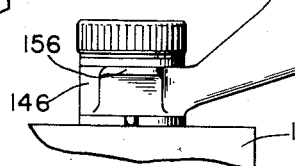
Fig. 13 is a section similar to Fig. 12 but showing the reel handle in operational position.
Figure 12:
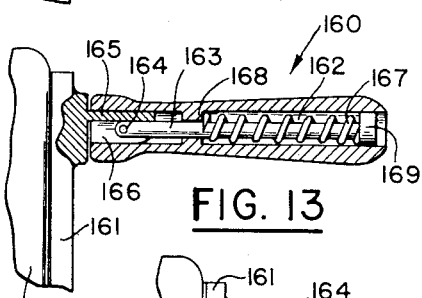
Fig. 12 is a section taken on line 12—12 of Fig. 11.

In order further to reduce the space occupied by the device when not in use, the handles 160 for rotating the drums 161 of the arms are pivotally mounted. To this end, each handle 160 is provided with an axial bore 162 in which a rod 163 is slidably guided. The end of the rod facing drum 161 is pivoted at 164 to a mounting post 165 which is provided with an axial slot 166 so that rod 163 and with it handle 160 can occupy either the position of Fig. 12 or the operational position of Fig. 13. A spring 167 biased by abutting against a shoulder 168 within bore 162 and a collar 169 at the end of rod 163 urges the handle either into the position of Fig. 12 or the position of Fig. 13. When it is desired to pivot the handle from the position of Fig. 12 into the position of Fig. 13, the handle and with it rod 163 are simply swung upwardly. As soon as the respective edge of the handle clears the forward edge of mounting post 165, the rounded forward edge of the post facilitating such swinging movement of the handle, spring 167 will pull the handle into the position of Fig. 13 in which the handle is rigidly held by post 165 for rotation of the reel. To return the handle into the position of Fig. 12, the handle is pulled outwardly against the tension of spring 167 until the respective end of the handle again clears post 165 whereupon the handle can be swung into the folding position.

The operation of a film viewing device, as hereinbefore described, is as follows:

Let it be assumed that the feed reel 12 is loaded with film to be viewed and that this film is to be continually moved through the viewing device by rotating the take-up reel 13.

Figure 4:
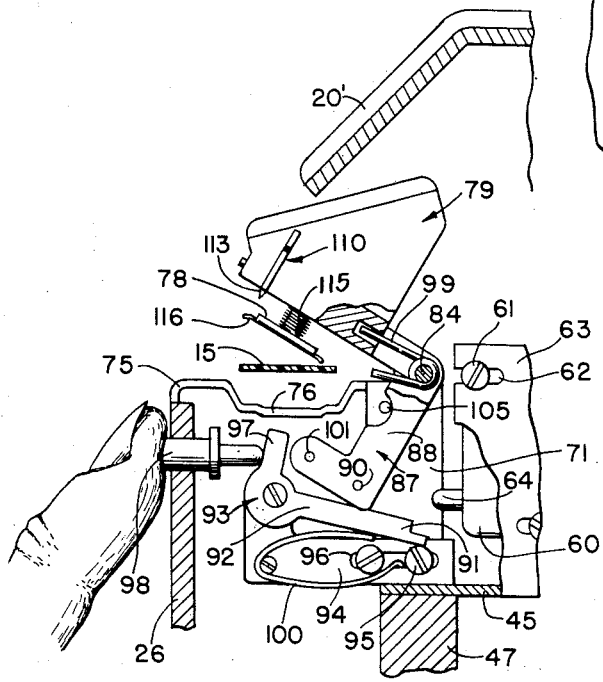
Fig. 4 is a fragmentary view of Fig. 3 showing the components illustrated in said figure in different operational positions.

Let it further be assumed that control member 79 is in the upwardly slanted position of Fig. 4. Then space is made available between rolls 35 and 36 for fitting the film therebetween and locking pin 101 of lever 87, being in engagement with the respective arm of lever 102, has swung the same into the position of Fig. 7 in which rolls 37 and 38 are spaced apart. Fig. 4 further shows that switch button 64 is released by arm 88 of lever 87 so that the circuit of lamp 54 is interrupted. Then, film 15 can be placed upon the guide tracks 76 and 22 with one of its holes fitted upon a sprocket of sprocket roll 36. Control member 79 is now pressed into the closed position of Fig. 1 or 3. The member is releasably locked in this position by the movement of lever 87, secured to member 79, into the position of Fig. 3 in which shoulder 91 on arm 92 of spring tensioned lever 93 is caught by locking pin 90 extending from lever 87. As a result, arm 88 of lever 87 now presses against switch button 64 thereby moving the same into the position closing the lamp circuit. Furthermore, locking pin 101 releases the respective arm of lever 102 whereby the same is pivoted by spring 104 into the position of Fig. 2 in which guide rolls 37 and 38 are in the positions for guiding the film therebetween. Finally, yieldably supported pressure plate 78 abuts against the upper side of the film resting in guide track 76 thereby holding the film in position and its sprocket holes in engagement with the sprockets of sprocket roll 36.

The film can now be continually moved through the device by rotating take-up reel 13 by cranking the same by means of handle 160. As will be obvious from the previous description, standing images of successive frames are reflected by the afore described mirror assembly upon the viewing screen 17, the effect of shutter sleeve 121 obturating the intervals between individual frames. In case it is found that the image is not properly centered upon the viewing screen, the necessary adjustments can be easily made by removing the cover of the casing and bending one or more of the mirrors accordingly.

When a frame image appears on the viewing screen which the observer wants to eliminate or when he wants to insert a title he presses the point 113 of the marking lever 110 into the film by slightly pressing upwardly against arm 111 of this lever. The indentation thus produced in the film will greatly facilitate the location of the respective frames in connection with which splicing or other operations are to be carried out later on.

Let it now be assumed that the entire film or the selected section thereof has been transported through the device and that it is desired to remove the film from the device. The operator then simply presses against release button 98 as is indicated in Fig. 4. The pressure of button 98 against arm 97 of lever 93 turns the same slightly in clockwise direction. As a result, shoulder 91 becomes disengaged from locking pin 90. Lever 87, by the action of spring 99, is snapped into the position of Fig. 4 in which the lamp circuit is again interrupted and the film is released by the spacing between the pairs of rolls 35, 36 and 37, 38 respectively. As appears from the previous description, the simple operation of pressing control member 79 from the position of Fig. 4 into the position of Fig. 3 readies the device for operation, and similarly the actuation of button 98 initiates all the operations that are necessary to release the film and to disconnect the lamp.

In case it is desired to adapt the viewing device to a film of a different width, say to change from an 8 millimeter film to a 16 millimeter film, the entire unit 70 is exchanged for a unit designed for 16 millimeter film by removal and re-insertion of the single screw 72. The locating pins 74 on bracket 45 will assure that the substituted unit 70 occupies the correct position.

As will be apparent from the previous description, the elements affected by a change from one film size to another one are condenser lens 82, pressure plate 78, gate or track 76, roll 35, sprocket roll 36, prism 120, obturator 121, the gear train between roll 36 and prism 120 and the projection lens 124. All these components form part of the exchangeable unit 70 so that by exchanging this unit, the viewing device can be adapted to a different film size in a very simple and efficient fashion. The lamp unit, the mirrors 130, 131 and 132 and the viewing screen may remain in the casing as they act for 16 mm. film in the same manner as they do for 8 mm. film.

When the viewing device is no longer to be used the two reel arms may be folded back against the side walls of the casing as has already been described.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for viewing and editing movie films comprising in combination a casing, film track guiding means for guiding film to be edited through the device with a continual movement, said track guiding means including a first and a second pair of guide rolls spaced apart in the direction of travel of film through the device, an electric light unit for directing a beam of light through successive frames of film moved through the device, a viewing screen forming part of a casing wall, light reflecting means within the casing optically interposed between the film guiding means and the viewing screen for reflecting images of successive frames upon the viewing screen, optical means including shutter means disposed within the casing between said film guiding means and said light reflecting means for making viewable upon the viewing screen a sequence of standing images of successive frames of film moved through the device, switch means within the casing controlling an energizing circuit for said light unit, a control unit for controlling the switch means and the film guiding means, the said control unit including one guide roll of said first pair, switch actuating means and a control member supporting the other guide roll of said first pair and coacting with the switch actuating means for controlling the latter, the said control member being pivotally mounted in said unit for movement between an operative position in which the guide rolls of the first pair are in a film track guiding relative position and the switch actuating means effect a closing of the switch means, and a release position in which the rolls of the said first pair are spaced apart for a removal or insertion of film and the said switch actuating means effect an opening of the switch means, and movable support means on the casing supporting one guide roll of the second pair, the other roll of the second pair being mounted on the casing, said control member further controlling an actuating member engageable with said movable support means for moving the said means into a position in which the guide roll of the second pair supported thereon is in the film releasing position in response to a movement of the control member into said release position.

2. A viewing device according to claim 1, further comprising a pair of coacting first and second two-arm levers pivotally mounted in said control unit, one arm of the first lever being fixedly secured to the control member for pivotal movement in unison therewith, the other arm forming said switch actuating means and also supporting said actuating member engageable with said movable support means for actuating the latter, the said other arm of the first lever being engageable in locking engagement with one arm of the second lever when the control member is in its operative position for retaining the said member in said position, a release member movably mounted on the casing and accessible from the outside thereof, and spring means biasing the control member into its release position, the other arm of the second lever being engageable by said release member for pivoting said second lever out of its locking engagement retaining the control member, the said pivotal movement of the second lever effecting a joint pivotal movement of the first lever and the control member whereby the circuit of said light unit is opened and both said movable guide rolls are moved into their relative release positions for removal or insertion of film.

3. A viewing device according to claim 2, wherein said other arm of the first lever ends in a lateral extension, the said extension and the respective arm of the second lever engageable with said other arm of the first lever having a locking nose and an abutment shoulder respectively engaging each other in locking engagement when said control member is in its operative position and being disengaged from each other when said control member is in its reelase position.

4. A viewing device according to claim 3, wherein the said movable support means comprises a two-arm lever supporting one of the guide rolls of said second pair and pivotally mounted on the casing, and spring means biasing said movable support means into a position in which the said guide roll of the second pair is in the film guiding position relative to the other roll of the second pair, and wherein said actuating member on the first lever of the control unit comprises an extension holding the said two-arm lever in its film releasing position when the control member is in its release position.

5. A viewing device according to claim 1 wherein said control unit further supports said optical means and constitutes a self-contained structural unit, and also comprising a support bracket within the casing for supporting said unit on the bracket, and fastening means for detachably securing said unit on said support bracket.

References Cited in the file of this patent

UNITED STATES PATENTS

| | | |
|---|---|---|
| 1,868,252 | Ponting et al. | July 19, 1932 |
| 1,894,963 | Proctor | Jan. 24, 1933 |
| 1,944,029 | Foster | Jan. 16, 1934 |
| 1,973,477 | Fritts | Sept. 11, 1934 |
| 2,114,608 | Ross | Apr. 19, 1938 |
| 2,168,190 | Busse | Aug. 1, 1939 |
| 2,211,218 | Serrurier | Aug. 13, 1940 |
| 2,218,256 | Bechtel | Oct. 15, 1940 |
| 2,278,781 | Harrison | Apr. 7, 1942 |
| 2,285,644 | Bernzott | June 9, 1942 |
| 2,422,816 | Baia | June 24, 1947 |
| 2,509,508 | Kalff et al. | May 30, 1950 |
| 2,551,482 | Wolk | May 1, 1951 |
| 2,554,892 | Briskin | May 29, 1951 |
| 2,576,586 | Frankel | Nov. 27, 1951 |
| 2,583,467 | Burleigh et al. | Jan. 22, 1952 |
| 2,651,967 | Thomas | Sept. 15, 1953 |